(12) United States Patent
Derbeko et al.

(10) Patent No.: US 8,886,883 B1
(45) Date of Patent: Nov. 11, 2014

(54) SYSTEM AND METHOD FOR IMPROVING CACHE PERFORMANCE

(75) Inventors: Philip Derbeko, Modiin (IL); Marik Marshak, Newton, MA (US); Arieh Don, Newton, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 329 days.

(21) Appl. No.: 13/436,906

(22) Filed: Mar. 31, 2012

(51) Int. Cl.
*G06F 12/02* (2006.01)
*G06F 12/08* (2006.01)

(52) U.S. Cl.
CPC ...... *G06F 12/0866* (2013.01); *G06F 2212/401* (2013.01)
USPC ............... 711/118; 711/4; 711/111; 711/112; 711/113; 711/114; 711/154; 711/156

(58) Field of Classification Search
CPC .................... G06F 2212/401; G06F 12/0866
USPC ............. 711/118, 4, 111, 112, 113, 114, 154, 711/156
See application file for complete search history.

(56) References Cited

U.S. PATENT DOCUMENTS

| | | | | |
|---|---|---|---|---|
| 4,809,065 A | * | 2/1989 | Harris et al. | 348/51 |
| 5,710,835 A | * | 1/1998 | Bradley | 382/233 |
| 5,875,454 A | * | 2/1999 | Craft et al. | 711/113 |
| 6,557,083 B1 | * | 4/2003 | Sperber et al. | 711/144 |
| 6,567,081 B1 | * | 5/2003 | Li et al. | 345/419 |
| 6,580,427 B1 | * | 6/2003 | Orenstein et al. | 345/422 |
| 6,724,391 B1 | * | 4/2004 | Peled et al. | 345/555 |
| 6,735,673 B2 | * | 5/2004 | Kever | 711/118 |
| 6,857,045 B2 | * | 2/2005 | Galbraith et al. | 711/118 |
| 6,920,477 B2 | * | 7/2005 | Mitzenmacher | 709/203 |
| 6,944,720 B2 | * | 9/2005 | Sperber et al. | 711/144 |
| 7,243,191 B2 | * | 7/2007 | Ying et al. | 711/118 |
| 7,412,564 B2 | * | 8/2008 | Wood et al. | 711/118 |
| 7,756,345 B2 | * | 7/2010 | Shiiyama | 382/232 |
| 7,930,483 B2 | * | 4/2011 | Borkenhagen | 711/118 |
| 7,984,240 B2 | * | 7/2011 | Borkenhagen | 711/118 |
| 8,554,745 B2 | * | 10/2013 | Pawar et al. | 707/693 |
| 8,595,437 B1 | * | 11/2013 | Glasco et al. | 711/118 |
| 8,700,862 B2 | * | 4/2014 | Glasco et al. | 711/144 |
| 8,725,939 B1 | * | 5/2014 | Clark et al. | 711/112 |
| 8,738,857 B1 | * | 5/2014 | Clark et al. | 711/118 |
| 8,738,858 B1 | * | 5/2014 | Clark et al. | 711/118 |
| 2010/0169382 A1 | * | 7/2010 | Sheaffer et al. | 707/802 |
| 2012/0137059 A1 | * | 5/2012 | Yang et al. | 711/104 |
| 2012/0137061 A1 | * | 5/2012 | Yang et al. | 711/105 |
| 2012/0144098 A1 | * | 6/2012 | Yang et al. | 711/103 |
| 2012/0144099 A1 | * | 6/2012 | Yang et al. | 711/103 |

\* cited by examiner

*Primary Examiner* — Stephen Elmore
(74) *Attorney, Agent, or Firm* — Brian J. Colandreo; Pamela K. Soggu; Holland & Knight LLP

(57) ABSTRACT

A method, computer program product, and computing system for identifying compressed content within a first cache system to a data array associated with the first cache system. Related content is located on the data array that is associated with the compressed content on the first cache system and it is determined whether the related content on the data array is compressible.

24 Claims, 4 Drawing Sheets

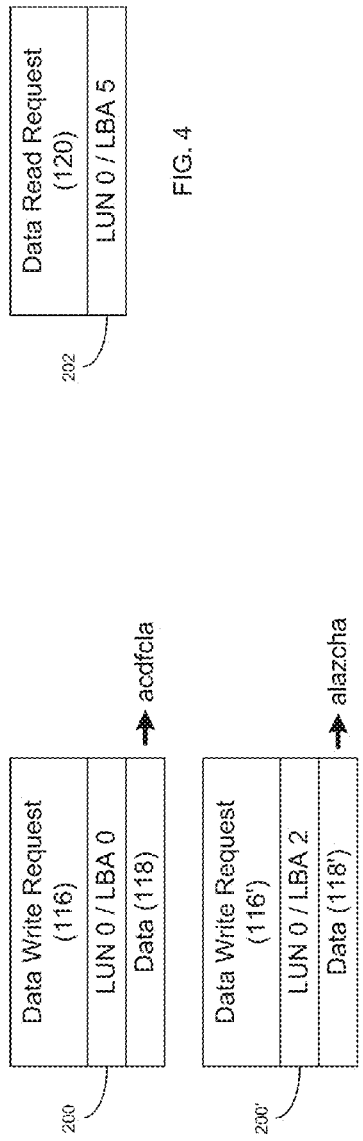

SYSTEM AND METHOD FOR IMPROVING CACHE PERFORMANCE

TECHNICAL FIELD

This disclosure relates to cache memory systems and, more particularly, to systems and methods for improving the performance of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes identifying compressed content within a first cache system to a data array associated with the first cache system. Related content is located on the data array that is associated with the compressed content on the first cache system and it is determined whether the related content on the data array is compressible.

One or more of the following features may be included. The first cache system may be included within an application server. The first cache system may be included within a controller of a data array. The related content may be compressed on the data array.

Identifying the compressed content to the data array may include providing the compression ratio of the compressed content to the data array. The related content may be compressed on the data array if the compression ratio exceeds a predefine threshold.

The first cache system may be a content-aware cache system. The data array may include one or more electro-mechanical hard disk drives In another implementation, a computer program product resides on a computer readable medium that has a plurality of instructions stored on it. When executed by a processor, the instructions cause the processor to perform operations including identifying compressed content within a first cache system to a data array associated with the first cache system. Related content is located on the data array that is associated with the compressed content on the first cache system and it is determined whether the related content on the data array is compressible.

One or more of the following features may be included. The first cache system may be included within an application server. The first cache system may be included within a controller of a data array. The related content may be compressed on the data array.

Identifying the compressed content to the data array may include providing the compression ratio of the compressed content to the data array. The related content may be compressed on the data array if the compression ratio exceeds a predefine threshold.

The first cache system may be a content-aware cache system. The data array may include one or more electro-mechanical hard disk drives In another implementation, a computing system includes at least one processor and at least one memory architecture coupled with the at least one processor, wherein the computing system is configured to perform operations including identifying compressed content within a first cache system to a data array associated with the first cache system. Related content is located on the data array that is associated with the compressed content on the first cache system and it is determined whether the related content on the data array is compressible.

One or more of the following features may be included. The first cache system may be included within an application server. The first cache system may be included within a controller of a data array. The related content may be compressed on the data array.

Identifying the compressed content to the data array may include providing the compression ratio of the compressed content to the data array. The related content may be compressed on the data array if the compression ratio exceeds a predefine threshold.

The first cache system may be a content-aware cache system. The data array may include one or more electro-mechanical hard disk drives The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a data write request for use with the data caching process of FIG. 1;

FIG. 4 is a diagrammatic view of a data read request for use with the data caching process of FIG. 1;

FIG. 5 is a diagrammatic view of a content directory for use with the data caching process of FIG. 1.

Like reference symbols in the various drawings indicate like elements.

DETAILED DESCRIPTION OF THE PREFERRED EMBODIMENTS

General Information

Figure 1:
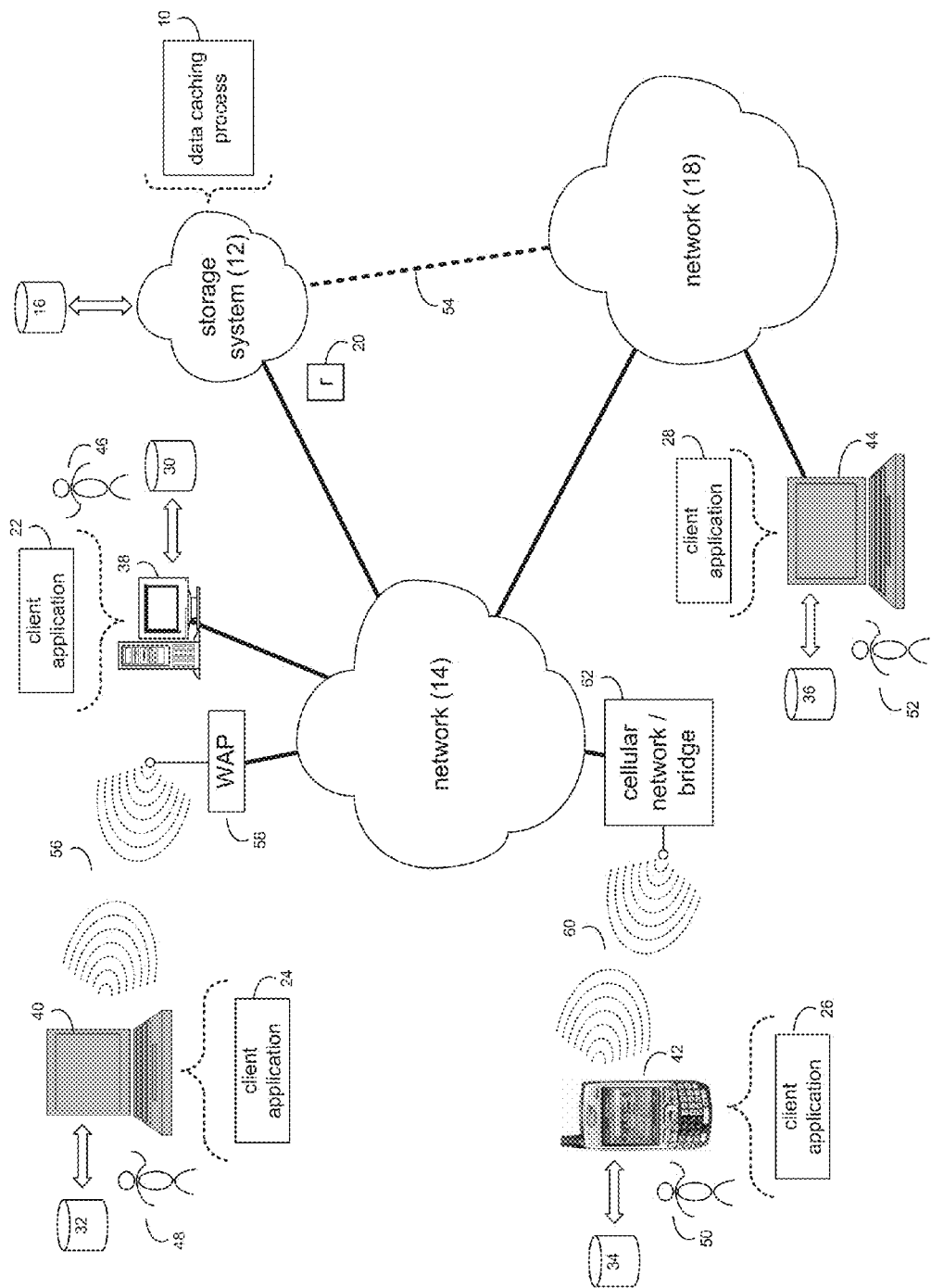
FIG. 1 is a diagrammatic view of a storage system and a data caching process coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

System Overview:

Referring to FIG. 1, there is shown data caching process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of data caching process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage system 12. Examples of data request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Client electronic devices 38, 40, 42, 44 may each execute an operating system, examples of which may include but are not limited to Microsoft Windows™, Microsoft Windows CE™, Redhat Linux™, or a custom operating system.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
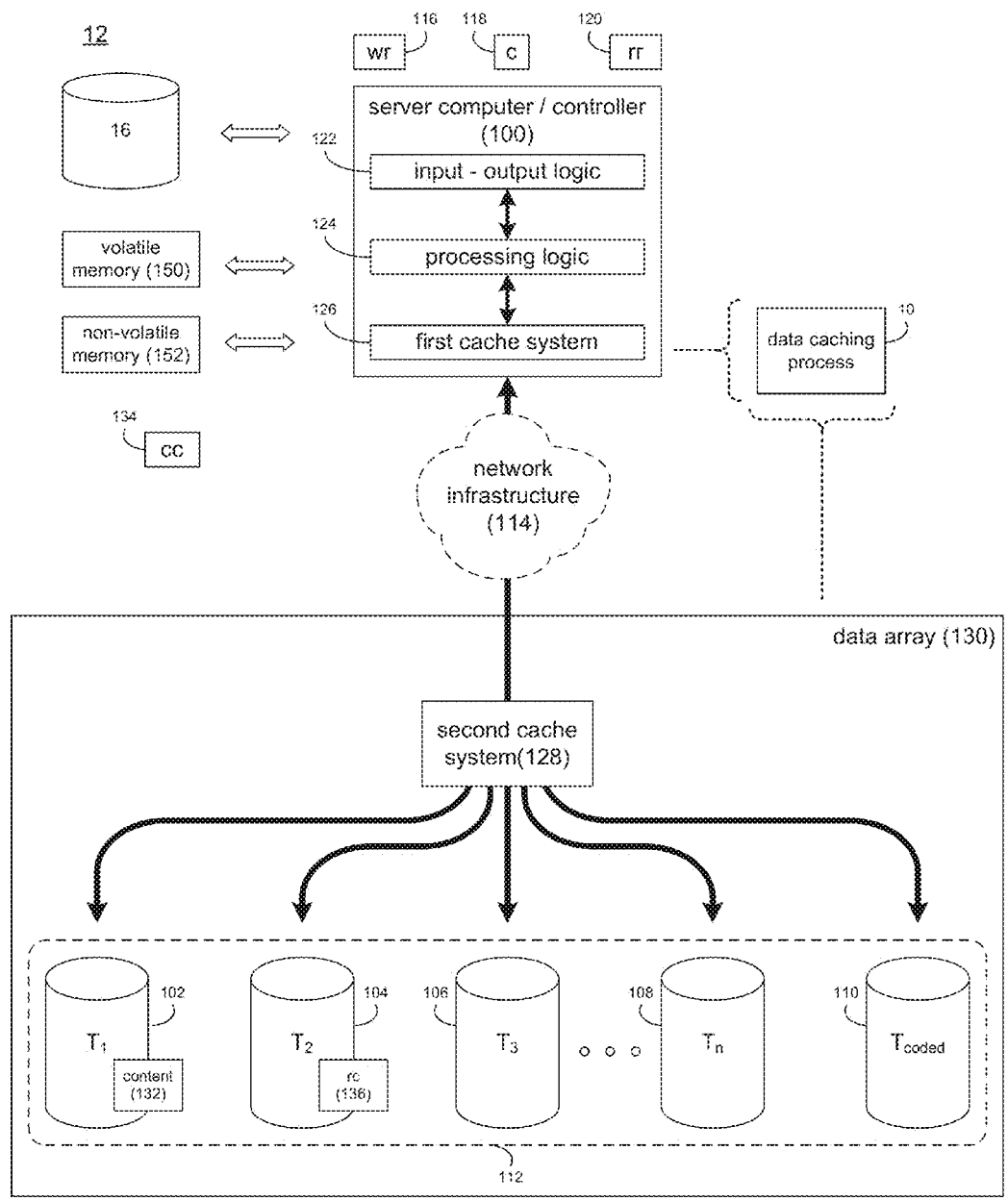
FIG. 2 is a diagrammatic view of the storage system of FIG. 1.
Figure 6:
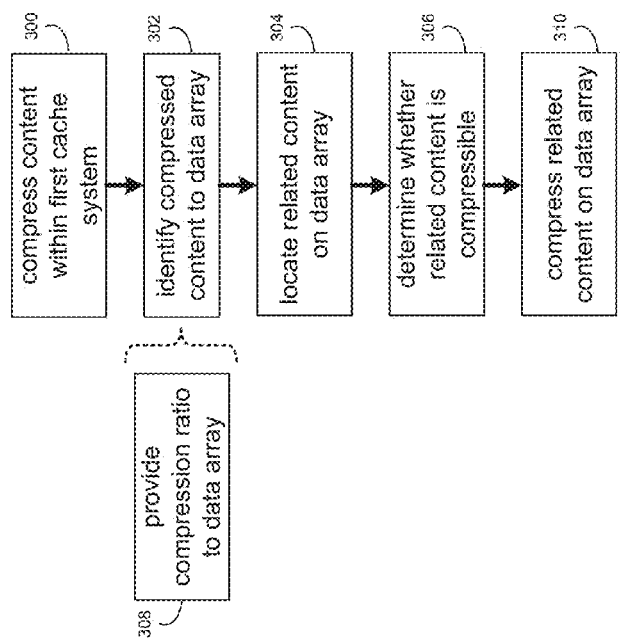
FIG. 6 is a flow chart of the data caching process of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data caching process 10. The instruction sets and subroutines of data caching process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various data requests (e.g. data request 20) may be generated. For example, these data requests may be sent from client applications 22, 24, 26, 28 to storage system 12. Additionally/alternatively and when server computer/controller 100 is configured as an application server, these data requests may be internally generated within server computer/controller 100. Examples of data request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an application server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of data requests (e.g., data request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of data requests (e.g., data request 20), the overall performance of storage system 12 may be enhanced. As will be described below in greater detail, second cache system 128 may be a content-aware cache system.

As discussed above, the instruction sets and subroutines of data caching process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data caching process 10 may be executed by one or more processors (not shown) and one or more memory architectures (not shown) included within data array 130.

Referring also to FIGS. 3-4, data request 20 (e.g. data read request 116 and/or data write request 120) may be processed by server computer/controller 100 to extract pertinent information concerning these data requests.

When data request 20 is a data write request (e.g., write request 116), write request 116 may include content 118 to be written to data array 130. Additionally, write request 116 may include a storage address 200 that defines the intended storage location within data array 130 at which content 118 is to be stored. For example, storage address 200 may define a particular logical unit within data array 130 (e.g., a LUN or Logical Unit Number) and a particular storage address within that specific logical unit (e.g., an LBA or Logical Block Address) for storing content 118.

Concerning read request 120, these requests do not include any content to be written to data array 130, as these are read requests and concern content to be read from data array 130. Read request 120 may include a storage address 202 that defines the storage location within data array 130 from which content is to be retrieved. For example, storage address 202 may define a particular logical unit within data array 130 (e.g., a LUN or Logical Unit Number) and a particular storage address within that specific logical unit (e.g., an LBA or Logical Block Address) for retrieving the content sought from data array 130.

As will be discussed below in greater detail and referring also to FIG. 5, data caching process 10 may maintain content directory 250, which may be used to locate various pieces of content within first cache system 126. In one particular embodiment of content directory 250, content directory 250 may include plurality of entries 252, wherein each of these entries may identify: data array storage address 200/202 (e.g. a logical storage unit and a storage address at which a specific piece of previously-written content is located within data array 130); first cache address 254 (e.g., the location within first cache system 126 at which the specific piece of previously-written content is also located), and content identifier 256 for the specific piece of previously-written content. Accordingly, content directory 250 may identify the location of specific pieces of content included within first cache system 126 and their corresponding pieces of data within data array 130, as well as a content identifier that uniquely identifies the specific piece of content.

Content identifier 256 may be used in a content-aware caching system and may, specifically, be a mathematical representation of the specific piece of previously-written content that may allow e.g. server computer/controller 100 to quickly determine whether two pieces of previously-written content are identical, as identical pieces of content would have identical content identifiers. In one particular embodiment, content identifier 256 may be a hash function (e.g., a cryptographic hash) of the previously-written content. Accordingly, through the use of a content-aware caching system, duplicate data entries within first cache system 126 and/or second cache system 128 may be quickly identified, avoided, and/or eliminated.

As is known in the art, a hash function is an algorithm/subroutine that maps large data sets to smaller data sets. The values returned by a hash function are typically called hash values, hash codes, hash sums, checksums or simply hashes. Hash functions are mostly used to accelerate table lookup or data comparison tasks such as e.g., finding items in a database and detecting duplicated or similar records in a large file.

General Read Request Processing:

During operation of server computer/controller 100, data caching process 10 may receive read request 120 on first cache system 126, wherein read request 120 identifies previously-written content (as defined by storage address 202) included within data array 130.

For example, assume that user 46 is using client application 22 to access data (i.e. content 132) that is currently being stored on data array 130. Accordingly, client application 22 may generate read request 120 which, as discussed above, may define a particular logical unit within data array 130 (e.g., a LUN or Logical Unit Number) and a particular storage address within that specific logical unit (e.g., an LBA or Logical Block Address) for retrieving content 132 sought from data array 130 by client application 22.

Assume that read request 120 defines LUN0/LBA5 as the location of content 132 within data array 130. Upon receiving read request 120, data caching process 10 may compare the location of content 132 within data array 130 (namely LUN0/LBA5) with each of the plurality of entries 252 defined within content directory 250 to determine if a copy of content 132 is locally available (i.e., cached) within first cache system 126. If LUN0/LBA5 was defined within content directory 250 (meaning that a local cached copy of content 132 is present/available within first cache system 126), that particular entry would also define a corresponding first cache address (e.g. first cache address 254) within first cache system 126 at which content 132 would be locally-available and retrievable from the first cache system 126. Conversely, in the event that LUN0/LBA5 is not defined within content directory 250 (meaning that a local cached copy of content 132 is not present/available within first cache system 126), data caching process 10 may need to obtain content 132 identified in read request 120 from data array 130.

In this particular example, since LUN0/LBA5 is not defined within content directory 250, a local cached copy of content 132 is not present/available within first cache system 126 and data caching process 10 will be need to obtain content 132 from data array 130.

Once content 132 is obtained by data caching process 10 from data array 130, data caching process 10 may store content 132 within first cache system 126 and may provide content 132 to client application 22, thus satisfying read request 120. Additionally, content directory 250 may be amended by data caching process 10 to include an entry (e.g., entry 258) that defines the data array storage address 200/202 (e.g. LUN0/LBA5); first cache address 254 (e.g., 111110), and content identifier 256 (e.g., ablccba) for content 132.

As discussed above, data array 130 may include second cache system 128. Accordingly, data caching process 10 may execute the above-described functionality with respect to second cache system 128.

General Write Request Processing:

During operation of server computer/controller 100, data caching process 10 may receive write request 116 on first cache system 126, wherein write request 116 identifies new content (e.g., content 118) to be written to data array 130.

For example, assume that user 46 is using client application 22 to create content (i.e. content 118) that is to be stored on data array 130. Accordingly, client application 22 may generate write request 116 which, as discussed above, may define a particular logical unit within data array 130 (e.g., a LUN or Logical Unit Number) and a particular storage address within that specific logical unit (e.g., an LBA or Logical Block Address) for storing content 118 within data array 130.

As discussed above and depending on the manner in which first cache system 126 is configured, data caching process 10 may immediately write content 118 to data array 130 (if first cache system 126 is configured as a write-through cache) or may subsequently write content 118 to data array 130 (if first cache system 126 is configured as a write-back cache).

Assuming that first cache system 126 in this example is configured as a write-through cache, data caching process 10 may immediately write content 118 to LUN0/LBA0 within data array 130 (as defined within write request 116). Additionally, data caching process 10 may locally-store content 118 within first cache system 126 and may amend content directory 250 to include an entry (e.g., entry 260) that defines the data array storage address 200/202 (e.g. LUN0/LBA0); first cache address 254 (e.g., 001011), and content identifier 256 (e.g., acdfcla) for content 118.

As discussed above, data array 130 may include second cache system 128. Accordingly, data caching process 10 may execute the above described functionality with respect to second cache system 128.

Content Aware Caching

As discussed above, content directory 250 may include a content identifier 256 that may be used in a content-aware caching system. A typical example of content identifier 256 may include but is not limited to a hash function of the content that content identifier 256 is associated with. Accordingly, through the use of content identifier 256 within a content-aware caching system, duplicate data entries within first cache system 126 and/or second cache system 128 may be quickly identified, avoided, and/or eliminated.

For example, upon receiving write request 116 and content 118, data caching process 10 may generate content identifier 256 for content 118. As discussed above, content identifier 256 generated for the content (i.e., content 118) identified within write request 116 may be a hash function (e.g., a cryptographic hash) of content 118.

Assume for illustrative purposes that write request 116 includes storage address 200 that defines the intended storage location for content 118 as LUN0/LBA0. Accordingly, upon receiving write request 116, data caching process 10 may generate content identifier 256 for content 118. Assume for illustrative purposes that data caching process 10 generates a hash of content 118, resulting in the generation of content identifier 256 (namely hash value acdfcla).

This newly-generated content identifier 256 (i.e. acdfcla) associated with content 118 may be compared to each of the other content identifiers (namely abalaby, alazchb, abalabz, alazcha) included within content directory 250 for first cache system 126 to determine if the newly-generated content identifier 256 (i.e. acdfcla) matches any of the other content identifiers (namely abalaby, alazchb, abalabz, alazcha) included within content directory 250.

As discussed above, each entry of the plurality of entries 252 included within content directory 250 is associated with a unique piece of content included within (in this example) first cache system 126. Accordingly, each unique content identifier included within content directory 250 may be associated with a unique piece of content written to (in this example) first cache system 126.

If, when performing this comparison, data caching process 10 does not identify a content identifier (i.e., abalaby, alazchb, abalabz, alazcha) within content directory 250 that matches the above-described, newly-generated content identifier (i.e. acdfcla), data caching process 10 may write content 118 to (in this example) first cache system 126 and may provide a copy of content 118 to data array 130 for storage within data array 130. Additionally, data caching process 10 may modify content directory 250 to include a new entry (i.e., entry 260) that defines the newly-generated content identifier (i.e. acdfcla), the location of content 118 within (in this example) first cache system 126 (i.e., 001011), and the location of content 118 within data array 130 (i.e., LUN0/LBA0).

If, when performing this comparison, data caching process 10 identified a content identifier within content directory 250 that matched the above-described, newly-generated content identifier (i.e. acdfcla), data caching process 10 would perform differently.

To illustrate how data caching process 10 would react if it found a matching content identifier, further assume for illustrative purposes that a second write request (i.e., write request 116') includes storage address 200' that defines the intended storage location for content 118' as LUN0/LBA2. Accordingly, upon receiving write request 116', data caching process 10 may generate content identifier 256 for content 118'. Assume for illustrative purposes that data caching process 10 generates a hash of content 118', resulting in the generation of content identifier 256 (namely hash value alazcha).

This newly-generated content identifier 256 (i.e. alazcha) associated with content 118' may be compared to each of the other content identifiers (namely abalaby, alazchb, abalabz, alazcha) included within content directory 250 for (in this example) first cache system 126 to determine if the newly-generated content identifier 256 (i.e. alazcha) matches any of the other content identifiers (namely abalaby, alazchb, abalabz, alazcha) included within content directory 250.

If, when performing this comparison, data caching process 10 does identify a content identifier (namely alazcha) within content directory 250 that matches the above-described, newly-generated content identifier (i.e. alazcha), data caching process 10 may perform a couple of functions.

For example, data caching process 10 may modify the entry (i.e., entry 262) within content directory 250 that is associated with the matching content identifier (i.e., alazcha) to include storage address 200' that defines the intended storage location for content 118' (i.e., LUN0/LBA2 within data array 130), thus generating modified entry 262'. Accordingly, modified entry 262' identifies that the pieces of content that are currently stored at LUN4/LBA7 and LUN0/LBA2 within data array 130 are identical. Accordingly, a single piece of cached content (located at first cache address 010111 within, in this example, first cache system 126) may be used as a local cached copy for both pieces of content stored on data array 130.

While the system is described above as modifying entry 262 by adding a second LUN/LBA designation to generate modified entry 262', this is for illustrative purposes only and is not intended to be a limitation of this disclosure, as other configurations are possible. For example, sub-tables/sub-entries may be utilized to show the manner in which multiple LUNs/LBAs are mapped to a single piece of content within, for example, first cache system 126.

As discussed above, data array 130 may include second cache system 128. Accordingly, data caching process 10 may execute the above-described content aware functionality with respect to second cache system 128.

Content Compression

It may be desirable to compress the data stored within first cache system 126 and data array 130 to conserve storage space. For example, as the quantity of storage space available within first cache system 126 is limited, data caching process 10 may routinely monitor and process the data within first cache system 126 to compress 300 the data (if possible) to maximize the efficiency of first cache system 126. Specifically, since data stored within first cache system 126 is stored within either volatile memory 150 or non-volatile memory 152, this data may be quickly retrieved for processing (when compared to a disk-based storage systems).

Accordingly, assume for illustrative purposes that data caching process 10 routinely compresses 300 data included within first cache system 126, thus generating compressed content (e.g. compressed content 134). As each piece of content included within first cache system 126 has a corresponding piece of content within (in this example) data array 130, data caching process 10 may identify 302 compressed content 134 to data array 130.

As discussed above, data caching process 10 may compress the data included within data array 130 in order to conserve storage space. However, the quantity of data included within data array 130 is often much greater (e.g., many orders of magnitude) than the quantity of data stored within first cache system 126. Further, the type of storage media included within data array 130 (e.g. electromechanical hard disk drives) is considerably slower (with respect to data access/data retrieval times) then the type of storage media included within first cache system 126 (e.g. random access memory systems and flash memory systems). Accordingly, it may take a considerable amount of time to process and compress data included within data array 130.

In order to enhance the efficiency of compressing the data included within data array 130, data caching process 10 may prioritize the processing of content (e.g. related content 136) included within data array 130 that is related to compressed content (e.g. compressed content 134) included within first cache system 126.

Accordingly, upon compressed content 134 within data array 132 being identified 302, data caching process 10 may locate 304 related content (e.g. related content 136) within data array 130. Locating the related content 136 within data array 130 may be accomplished through use of the above-described content directory 250 (to obtain the address of the content), which correlates content stored within first cache system 126 to content stored within storage array 130. As discussed above and in this example, related content 136 located on data array 130 is the uncompressed version of compressed content 134 located on first cache system 126.

Data caching process 10 may process related content 136 to determine 306 whether related content 136 on data array 130 is compressible. For example, data caching process 10 may analyze related content 136 to determine the level at which related content 136 may be compressed within data array 130. Alternatively/additionally, as related content 136 was already compressed on first cache system 126 (i.e. in the form of compressed content 134), data caching process 10 already knows the level of compressibility of related content 136. Accordingly, when identifying 302 compressed content 134 to data array 130, data caching process 10 may provide 308 the compression ratio of compressed content 134 to data array 130. Data caching process 10 may subsequently use this compression ratio when determining 306 whether related content 136 on data array 130 is compressible.

Assume for illustrative purposes that when data caching process 10 was initially compressing content to generate compressed content 134, data caching process 10 determined a compression ratio for compressed content 134. For example, if the original content was 1.00 MB in size and compressed content 134 is 200 kB in size, data caching process 10 may determine a compression ratio of 5:1 for compressed content 134. Data caching process 10 may provide 308 this compression ratio to data array 130.

Upon receiving this compression ratio, data caching process 10 may compare this compression ratio to a predefined threshold to determine whether related content 136 (stored on data array 130) is compressible. For example, assume for illustrative purposes that this predefined threshold is 3:1, wherein if the compression ratio is less than 3:1, related content 136 (stored on data array 130) would not be compressed 310 by data caching process 10, as the computational expense of compressing related content 136 would not be offset by the space savings achieved. However, if the compression ratio is greater than or equal to 3:1, data caching process 10 would compress 310 related content 136, as the space savings achieved on data array 130 would offset the computational expense of compressing related content 136. Since the compression ratio of compressed content 134 is 5:1 (i.e., greater than or equal to 3:1), data caching process 10 may compress 310 related content 136.

As discussed above, data array 130 may include second cache system 128. Accordingly, if data caching process 10 compresses 310 related content 136 on data array 130 and data array 130 also includes second cache system 128, compressing 310 related content 136 may also include/may alternatively include compressing any cached copies of related content 136 stored on second cache system 128.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed by a programmed processor configured to perform one or more operations, the operations comprising:
    identifying, using the programmed processor, compressed content within a first cache system to a data array associated with the first cache system;
    locating, using the programmed processor, related content on the data array that is associated with the compressed content on the first cache system; and
    determining, using the programmed processor, whether the related content on the data array is compressible.

2. A computer-implemented method of claim 1 wherein the first cache system is included within an application server.

3. A computer-implemented method of claim 1 wherein the first cache system is included within a controller of a data array.

4. The computer-implemented method of claim 1 further comprising:
    compressing the related content on the data array.

5. The computer-implemented method of claim 1 wherein identifying the compressed content to the data array includes:
    providing the compression ratio of the compressed content to the data array.

6. The computer-implemented method of claim 5 further comprising:
    compressing the related content on the data array if the compression ratio exceeds a predefined threshold.

7. The computer-implemented method of claim 1 wherein the first cache system is a content-aware cache system.

8. The computer-implemented method of claim 1 wherein the data array includes one or more electro-mechanical hard disk drives.

9. A computer program product residing on a non-transitory computer readable medium having a plurality of instructions stored thereon which, when executed by a processor, cause the processor to perform operations comprising:

identifying compressed content within a first cache system to a data array associated with the first cache system;

locating related content on the data array that is associated with the compressed content on the first cache system; and determining whether the related content on the data array is compressible.

10. A computer program product of claim 9 wherein the first cache system is included within an application server.

11. A computer program product of claim 9 wherein the first cache system is included within a controller of a data array.

12. The computer program product of claim 9 further comprising:

compressing the related content on the data array.

13. The computer program product of claim 9 wherein identifying the compressed content to the data array includes:

providing the compression ratio of the compressed content to the data array.

14. The computer program product of claim 13 further comprising:

compressing the related content on the data array if the compression ratio exceeds a predefined threshold.

15. The computer program product of claim 9 wherein the first cache system is a content-aware cache system.

16. The computer program product of claim 9 wherein the data array includes one or more electro-mechanical hard disk drives.

17. A computing system including at least one processor and at least one memory architecture coupled with the at least one processor, wherein the computing system is configured to perform operations comprising:

identifying compressed content within a first cache system to a data array associated with the first cache system;

locating related content on the data array that is associated with the compressed content on the first cache system; and determining whether the related content on the data array is compressible.

18. A computing system of claim 17 wherein the first cache system is included within an application server.

19. A computing system of claim 17 wherein the first cache system is included within a controller of a data array.

20. The computing system of claim 17 further comprising:

compressing the related content on the data array.

21. The computing system of claim 17 wherein identifying the compressed content to the data array includes:

providing the compression ratio of the compressed content to the data array.

22. The computing system of claim 21 further comprising:

compressing the related content on the data array if the compression ratio exceeds a predefined threshold.

23. The computing system of claim 17 wherein the first cache system is a content-aware cache system.

24. The computing system of claim 17 wherein the data array includes one or more electro-mechanical hard disk drives.

* * * * *